United States Patent
Huang et al.

(10) Patent No.: US 11,847,147 B2
(45) Date of Patent: Dec. 19, 2023

(54) METHOD FOR BUILDING RANKING MODEL, QUERY AUTO-COMPLETION METHOD AND CORRESPONDING APPARATUSES

(71) Applicant: BAIDU ONLINE NETWORK TECHNOLOGY (BEIJING) CO., LTD., Beijing (CN)

(72) Inventors: Jizhou Huang, Beijing (CN); Haifeng Wang, Beijing (CN); Miao Fan, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 0 days.

(21) Appl. No.: 17/311,772

(22) PCT Filed: Sep. 24, 2020

(86) PCT No.: PCT/CN2020/117561
§ 371 (c)(1),
(2) Date: Jun. 8, 2021

(87) PCT Pub. No.: WO2021/139222
PCT Pub. Date: Jul. 15, 2021

(65) Prior Publication Data
US 2022/0327151 A1    Oct. 13, 2022

(30) Foreign Application Priority Data
Jan. 6, 2020 (CN) .......................... 202010011383.8

(51) Int. Cl.
*G06F 16/332* (2019.01)
*G06F 16/33* (2019.01)
(Continued)

(52) U.S. Cl.
CPC ........ *G06F 16/3322* (2019.01); *G06F 16/335* (2019.01); *G06F 16/338* (2019.01);
(Continued)

(58) Field of Classification Search
CPC .. G06F 16/3322; G06F 16/338; G06F 16/335; G06F 16/3347; G06N 3/04
See application file for complete search history.

(56) References Cited

U.S. PATENT DOCUMENTS

| 10,468,142 B1 | 11/2019 | Abou Shousha et al. |
| 2017/0139926 A1 | 5/2017 | Baig |

(Continued)

FOREIGN PATENT DOCUMENTS

| CN | 106649605 A | 5/2017 |
| CN | 107507054 A | 12/2017 |

(Continued)

OTHER PUBLICATIONS

Manojkumar Rangasamy Kannadasan and Grigor Aslanyan. "Personalized Query Auto-Completion Through a Lightweight Representation of the User Context." In Proceedings of the SIGIR 2019 Workshop on eCommerce, Paris, France, Jul. 25, 2019. ( Year: 2019).*

(Continued)

*Primary Examiner* — Kannan Shanmugasundaram
(74) *Attorney, Agent, or Firm* — Brooks Kushman P.C.

(57) ABSTRACT

The present application discloses a method for building a ranking model, a query auto-completion method and corresponding apparatuses, which relates to the technical field of intelligent search. An implementation includes: acquiring from a POI query log a query prefix input when a user selects a POI from query completion suggestions, POIs in the query completion suggestions corresponding to the query prefix and the POI selected by the user in the query completion (Continued)

suggestions; constructing positive and negative example pairs using the POI selected by the user and the POIs not selected by the user in the query completion suggestions corresponding to the same query prefix; and performing a training operation using the query prefix and the positive and negative example pairs corresponding to the query prefix to obtain the ranking model.

10 Claims, 9 Drawing Sheets

(51) Int. Cl.
*G06F 16/338* (2019.01)
*G06F 16/335* (2019.01)
*G06N 3/04* (2023.01)
*G06F 18/22* (2023.01)
*G06F 18/214* (2023.01)

(52) U.S. Cl.
CPC ........ *G06F 16/3347* (2019.01); *G06F 18/214* (2023.01); *G06F 18/22* (2023.01); *G06N 3/04* (2013.01)

(56) References Cited

U.S. PATENT DOCUMENTS

| | | | |
|---|---|---|---|
| 2018/0349387 | A1 | 12/2018 | Zhang et al. |
| 2018/0365247 | A1 | 12/2018 | Baig |
| 2019/0057036 | A1 | 2/2019 | Mathuriya et al. |
| 2019/0179917 | A1* | 6/2019 | Agrawal ............ G06F 16/9537 |
| 2021/0133227 | A1 | 5/2021 | Baig |

FOREIGN PATENT DOCUMENTS

| | | |
|---|---|---|
| CN | 107862004 A | 3/2018 |
| CN | 108427756 A | 8/2018 |
| CN | 109670161 A | 4/2019 |
| CN | 110377706 A | 10/2019 |
| CN | 110442689 A | 11/2019 |
| CN | 111221952 A | 6/2020 |
| EP | 3557505 A | 10/2019 |

OTHER PUBLICATIONS

Park, D.H., Chiba, R.: A Neural Language Model for Query Auto-Completion. In: Proceedings of the 40th International ACM SIGIR Conference on Research and Development in Information Retrieval, SIGIR 2017, pp. 1189-1192. ACM, New York (Year: 2017).*
Extended European Search Report of European application No. 20894908.1 dated Jan. 25, 2022, 9 pages.
Kannadasan et al., "Personalized query Auto-Completion Through a Lightweight Representation of the User Context", Proceedings of Under Review, [Online] vol. 8, May 3, 2019, XP055876035, Retrieved from the Internet: URL: <https://arxiv.org/pdf/1905.01386.pdf>, retrieved on Jan. 3, 2022, 8 pages.
Shokouhi, Milad, "Learning to Personalize Query Auto-Completion,", SIGIR July 28-Aug. 1, 2013, pp. 103-112, Association for Computing Machinery, Dublin, Ireland.
Xuan, Tian et al., "Research Review of Time-Sensitive Query Auto-completion Technique," ACTA Electronica Sinica, Jun. 2015, pp. 1160-1168, vol. 43 No. 6 Beijing, China.
Chinese Office Action dated Oct. 20, 2020 for related Chinese Application No. 202010011383.8, 9 pages.
International Search Report dated Dec. 21, 2020 for application No. PCT/CN2020/117561, 9 pages.
Chinese Search Report dated Oct. 11, 2020 for Application No. 202010011383.8, 2 pages.

* cited by examiner

US 11,847,147 B2

METHOD FOR BUILDING RANKING MODEL, QUERY AUTO-COMPLETION METHOD AND CORRESPONDING APPARATUSES

This application is the U.S. national phase of PCT Application No. PCT/CN2020/117561 filed on Sep. 24, 2020, which claims priority to Chinese Patent Application No. 202010011383.8 filed on Jan. 6, 2020, which are incorporated herein by reference in their entireties.

The present application claims priority to Chinese Patent Application No. 2020100113838, entitled "Method for Building Ranking Model, Query Auto-completion Method and Corresponding Apparatuses", filed on Jan. 6, 2020.

FIELD OF THE DISCLOSURE

The present application relates to the technical field of computer applications, and particularly to a method for building a ranking model, a query auto-completion method and corresponding apparatuses in the technical field of intelligent search.

BACKGROUND OF THE DISCLOSURE

Currently, Query Auto-Completion (QAC) is widely used by mainstream general search engines and vertical search engines. For example, in a map application, when a user inputs a query to search for a certain Point of Interest (POI), starting from the user inputting an incomplete query (which is referred to as a query prefix in the present application), a search engine may recommend a series of candidate POIs to the user in real time in a candidate list for the user to select as a completion result of the query (queries recommended in the candidate list are referred to as query completion suggestions in the present application). Once the user finds an intended POI in the candidate list, the query may be completed by selecting this POI from the candidate list, thereby initiating a search for this POI.

For example, as shown in FIG. 1, when the user inputs a query prefix "Baidu" in a search box of the map application, candidate POIs, such as "Baidu Building", "Baidu Building-Tower C", "Baidu Science & Technology Park", or the like, may be recommended to the user in the form of a candidate list for the user to select, and once the user selects "Baidu Building" therefrom, the query is completed, and a search for "Baidu Building" is initiated.

However, in the existing query auto-completion scheme, the suggestions provided for the same query prefixes are all the same, for example, all the suggestions are ranked in the candidate list based on the search popularity of each POI without considering user habits for inputting the query prefixes. For example, the user habitually clicks "Baidu Building-Tower A" from the query completion suggestions for search when inputting the query prefix "ba". However, since the POIs in the query completion suggestions are ranked according to the search popularity, popular POIs, such as "Badaling great wall", "Badaling outlets", "Badachu", "Baidu Building", or the like, are always ranked higher, and the user always needs to find "Baidu Building-Tower A" ranked lower from the query completion suggestions, or further input a few characters to select "Baidu Building-Tower A". Obviously, the user has a high input cost and a low efficiency.

SUMMARY OF THE DISCLOSURE

In view of this, the present application provides a method for building a ranking model, a query auto-completion method, corresponding apparatuses, a device and a computer storage medium, such that recommended query completion suggestions better conform to user habits for inputting query prefixes, thus reducing the input cost of a user.

In a first aspect, the present application provides a method for building a ranking model for query auto-completion, including:

acquiring from a POI query log a query prefix input when a user selects a POI from query completion suggestions, POIs in the query completion suggestions corresponding to the query prefix and the POI selected by the user in the query completion suggestions;

constructing positive and negative example pairs using the POI selected by the user and the POIs not selected by the user in the query completion suggestions corresponding to the same query prefix; and performing a training operation using the query prefix and the positive and negative example pairs corresponding to the query prefix to obtain the ranking model;

wherein the ranking model has a training target of maximizing the difference between the similarity of vector representation of the query prefix and vector representation of the corresponding positive example POI and the similarity of the vector representation of the query prefix and vector representation of the corresponding negative example POIs.

According to a preferred implementation of the present application, the ranking model includes a prefix embedded network, a POI embedded network, and a ranking network; and the prefix embedded network is configured to obtain the vector representation of the query prefix, the POI embedded network is configured to obtain the vector representation of each POI, and the ranking network is configured to determine the similarity between the vector representation of the query prefix and the vector representation of the corresponding POIs.

According to a preferred implementation of the present application, the prefix embedded network includes a recurrent neural network; and the obtaining the vector representation of the query prefix includes:

sequentially inputting a character vector corresponding to each character in the query prefix into the recurrent neural network, and obtaining the vector representation of the query prefix using a feature vector for the last character output by the recurrent neural network; or splicing vectors of attribute features of the user and a character vector corresponding to each character in the query prefix respectively, then sequentially inputting the results into the recurrent neural network, and obtaining the vector representation of the query prefix using a feature vector corresponding to the last character and output by the recurrent neural network.

According to a preferred implementation of the present application, the obtaining the vector representation of each POI includes:

encoding attribute information of the POI to obtain the vector representation of the POI.

According to a preferred implementation of the present application, the POI embedded network includes a convolutional neural network, a feedforward neural network and a fully connected layer; and the encoding attribute information of the POI includes:
encoding name and address information of the POI by the convolutional neural network;
encoding other attribute information of the POI by the feedforward neural network; and splicing the encoding results of the same POI, and then mapping the splicing result by the fully connected layer to obtain the vector representation of the POI.

According to a preferred implementation of the present application, in the process of training the ranking model, a triple loss function is determined using output of the ranking network, and feedforward is performed using the triple loss function to update model parameters of the prefix embedded network, the POI embedded network and the ranking network until the triple loss function meets a preset requirement or a preset number of times that the model parameters are updated is reached.

In a second aspect, the present application provides a query auto-completion method, including:

acquiring a query prefix input by a user currently, and determining candidate Points of Interest (POIs) corresponding to the query prefix;

inputting the query prefix and the candidate POIs into a ranking model to obtain a score of each candidate POI by the ranking model, wherein the scores of the candidate POIs are obtained according to the similarity between vector representation of the query prefix and vector representation of the candidate POIs; and determining query completion suggestions recommended to the user according to the scores of respective candidate POIs;

wherein the ranking model is obtained by performing a pre-training operation with the method as mentioned above.

According to a preferred implementation of the present application, the vector representation of the query prefix is obtained by:

in the ranking model, sequentially inputting a character vector corresponding to each character in the query prefix into a recurrent neural network, and obtaining the vector representation of the query prefix using a feature vector for the last character output by the recurrent neural network; or in the ranking model, splicing vectors of attribute features of the user and a character vector corresponding to each character in the query prefix respectively, then sequentially inputting the results into a recurrent neural network, and obtaining the vector representation of the query prefix using a feature vector corresponding to the last character and output by the recurrent neural network.

According to a preferred implementation of the present application, the vector representation of each POI is determined by:

in the ranking model, encoding attribute information of each POI to obtain the vector representation of the POI.

According to a preferred implementation of the present application, the encoding attribute information of the POI includes:

in the ranking model, encoding name and address information of the POI by a convolutional neural network;

encoding other attribute information of the POI by a feedforward neural network; and splicing the encoding results of the same POI, and then mapping the splicing result by a fully connected layer to obtain the vector representation of the POI.

In a third aspect, the present application provides an apparatus for building a ranking model for query auto-completion, including:

a first acquiring unit configured to acquire from a POI query log a query prefix input when a user selects a POI from query completion suggestions, POIs in the query completion suggestions corresponding to the query prefix and the POI selected by the user in the query completion suggestions;

a second acquiring unit configured to construct positive and negative example pairs using the POI selected by the user and the POIs not selected by the user in the query completion suggestions corresponding to the same query prefix; and a model training unit configured to perform a training operation using the query prefix and the positive and negative example pairs corresponding to the query prefix to obtain a ranking model;

wherein the ranking model has a training target of maximizing the difference between the similarity of vector representation of the query prefix and vector representation of the corresponding positive example POI and the similarity of the vector representation of the query prefix and vector representation of the corresponding negative example POIs.

According to a preferred implementation of the present application, the ranking model includes a prefix embedded network, a POI embedded network, and a ranking network; and the prefix embedded network is configured to obtain the vector representation of the query prefix, the POI embedded network is configured to obtain the vector representation of each POI, and the ranking network is configured to determine the similarity between the vector representation of the query prefix and the vector representation of the corresponding POIs.

According to a preferred implementation of the present application, the prefix embedded network includes a recurrent neural network; and in the process of training the ranking model, the model training unit is specifically configured to:

sequentially input a character vector corresponding to each character in the query prefix into the recurrent neural network, and obtain the vector representation of the query prefix using a feature vector for the last character output by the recurrent neural network; or splice vectors of attribute features of the user and a character vector corresponding to each character in the query prefix respectively, then sequentially input the results into the recurrent neural network, and obtain the vector representation of the query prefix using a feature vector corresponding to the last character and output by the recurrent neural network.

According to a preferred implementation of the present application, in the process of training the ranking model, the model training unit is specifically configured to encode attribute information of the POI by the POI embedded network to obtain the vector representation of the POI.

According to a preferred implementation of the present application, the POI embedded network includes a convolutional neural network, a feedforward neural network and a fully connected layer; and when encoding the attribute information of the POI by the POI embedded network, the model training unit is specifically configured to:

encode name and address information of the POI by the convolutional neural network;

encode other attribute information of the POI by a feedforward neural network; and splice the encoding results of the same POI, and then map the splicing result by a fully connected layer to obtain the vector representation of the POI.

According to a preferred implementation of the present application, in the process of training the ranking model, the model training unit determines a triple loss function using output of the ranking network, and performs feedforward using the triple loss function to update model parameters of the prefix embedded network, the POI embedded network and the ranking network until the triple loss function meets a preset requirement or a preset number of times that the model parameters are updated is reached.

In a fourth aspect, the present application provides a query auto-completion apparatus, including:

an acquiring unit configured to acquire a query prefix input by a user currently, and determine candidate Points of Interest (POIs) corresponding to the query prefix;

a scoring unit configured to input the query prefix and the candidate POIs into a ranking model to obtain a score of each candidate POI by the ranking model, wherein the scores of the candidate POIs are obtained according to the similarity between vector representation of the query prefix and vector representation of the candidate POIs; and a query completion unit configured to determine query completion suggestions recommended to the user according to the scores of respective candidate POIs;

wherein the ranking model is obtained by performing a pre-training operation by the apparatus as mentioned above.

According to a preferred implementation of the present application, the scoring unit is specifically configured to:

in the ranking model, sequentially input a character vector corresponding to each character in the query prefix into a recurrent neural network, and obtain the vector representation of the query prefix using a feature vector for the last character output by the recurrent neural network; or in the ranking model, splice vectors of attribute features of the user and a character vector corresponding to each character in the query prefix respectively, then sequentially input the results into a recurrent neural network, and obtain the vector representation of the query prefix using a feature vector corresponding to the last character and output by the recurrent neural network.

According to a preferred implementation of the present application, the scoring unit is specifically configured to:

in the ranking model, encode attribute information of each POI to obtain the vector representation of the POI.

According to a preferred implementation of the present application, the scoring unit is specifically configured to:

in the ranking model, encode name and address information of the POI by a convolutional neural network;

encode other attribute information of the POI by a feed-forward neural network; and splice the encoding results of the same POI, and then map the splicing result by a fully connected layer to obtain the vector representation of the POI.

In a fifth aspect, the present application further provides an electronic device, including:

at least one processor;

a memory connected with the at least one processor communicatively;

wherein the memory stores instructions executable by the at least one processor to enable the at least one processor to perform the method as mentioned above.

In a sixth aspect, the present application further provides a non-transitory computer readable storage medium with computer instructions stored thereon, wherein the computer instructions are used for causing a computer to perform any of the methods as mentioned above.

According to the above technical solution of the present application, the query prefix input by the user is merged into the ranking model for POI ranking learning, such that the ranking model may learn the personalized query prefix input by the user when the user selects the POI in the query completion suggestions. Query auto-completion performed based on the ranking model may better conform to user habits for inputting the query prefix, thus reducing the input cost of the user.

Other effects of the above-mentioned alternatives will be described below in conjunction with embodiments.

BRIEF DESCRIPTION OF DRAWINGS

The drawings are used for better understanding the present solution and do not constitute a limitation of the present application. In the drawings.

DETAILED DESCRIPTION OF PREFERRED EMBODIMENTS

The following part will illustrate exemplary embodiments of the present application with reference to the drawings, including various details of the embodiments of the present application for a better understanding. The embodiments should be regarded only as exemplary ones. Therefore, those skilled in the art should appreciate that various changes or modifications can be made with respect to the embodiments described herein without departing from the scope and spirit of the present application. Similarly, for clarity and conciseness, the descriptions of the known functions and structures are omitted in the descriptions below.

Figure 1:
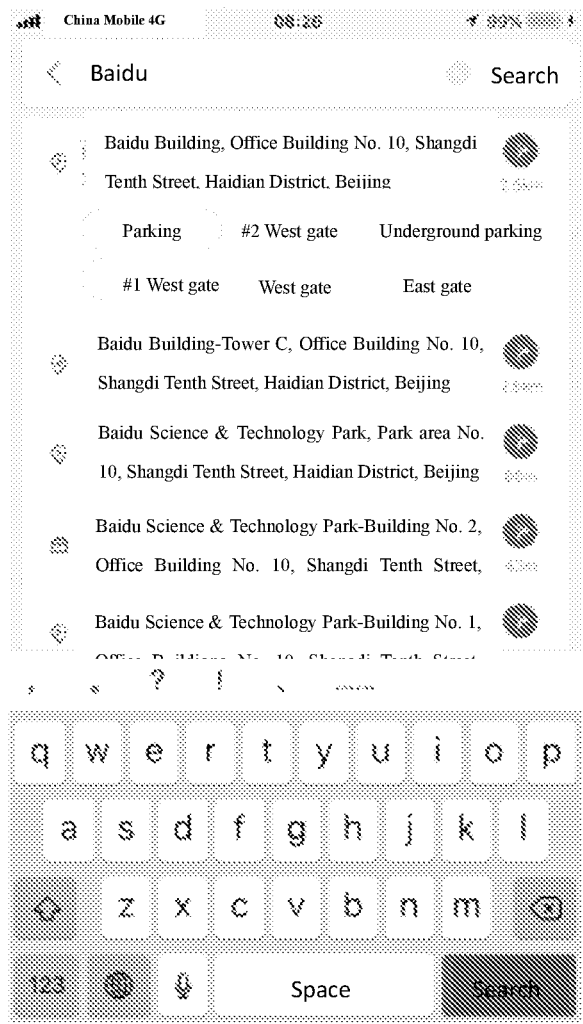
FIG. 1 is an exemplary diagram of a query auto-completion interface.
Figure 2:
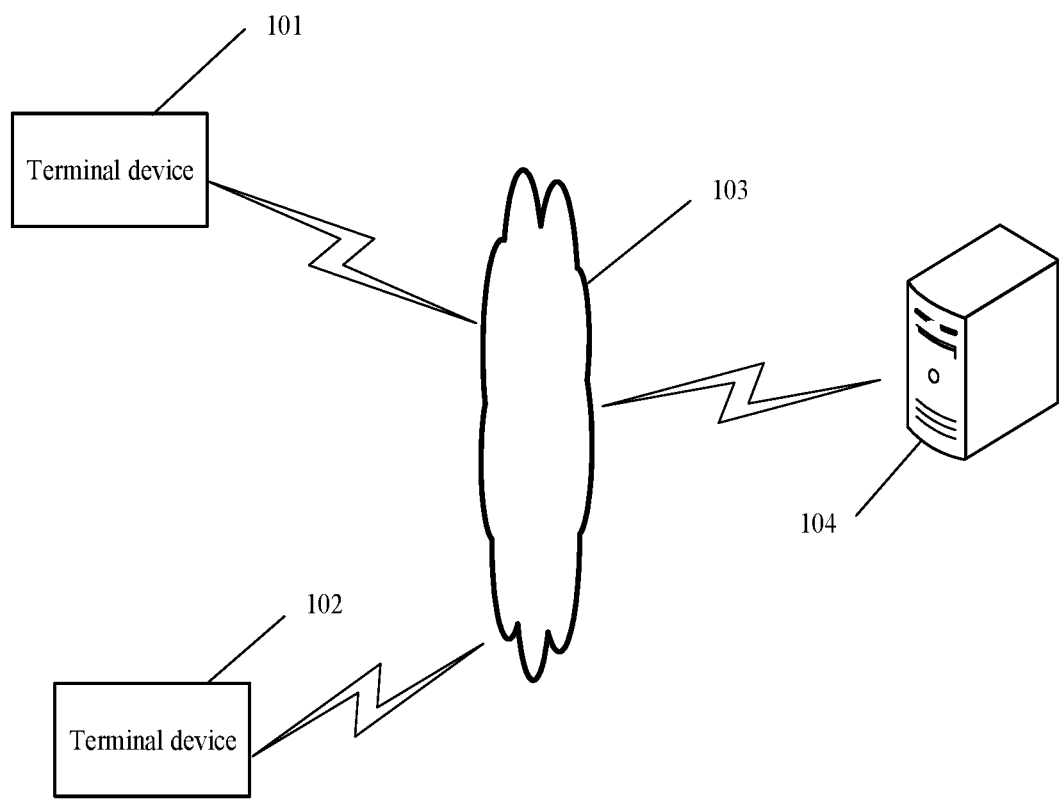
FIG. 2 shows an exemplary system architecture to which embodiments of the present disclosure may be applied.

FIG. 2 shows an exemplary system architecture to which the embodiment of the present disclosure may be applied. As shown in FIG. 2, the system architecture may include terminal devices 101, 102, a network 103 and a server 104. The network 103 serves as a medium for providing communication links between the terminal devices 101, 102 and the server 104. The network 103 may include various connection types, such as wired and wireless communication links, or fiber-optic cables, or the like.

Users may use the terminal devices 101, 102 to interact with the server 104 through the network 103. Various applications, such as a voice interaction application, a web browser application, a communication application, or the like, may be installed on the terminal devices 101, 102.

The terminal devices 101, 102 may be configured as various electronic devices, including, but not limited to, smart phones, PCs, smart televisions, or the like. A query auto-completion apparatus according to the present disclosure may be provided and run on the server 104. The apparatus may be implemented as a plurality of pieces of software or software modules (for example, for providing distributed service), or a single piece of software or software module, which is not limited specifically herein.

For example, when a user inputs a query prefix on a retrieval interface provided by a browser or a client on the terminal device 101, the browser or the client provides the query prefix to the server 104 in real time, and the server returns query completion suggestions corresponding to the query prefix currently input by the user to the terminal device 101 with a method according to the present application. If the user finds a wanted POI from the query completion suggestions, a search for this POI may be initiated by selecting the POI. If the user does not find the wanted POI from the query completion suggestions, an input operation may continue, the browser or the client then provides the query prefix for the server 104 in real time, and the server 104 returns the query completion suggestions corresponding to the query prefix input by the user, thereby achieving an effect that in the process of inputting a query by the user, the query completion suggestions are recommended to the user in real time along with the query prefix input by the user.

The server 104 may be configured as a single server or a server group including a plurality of servers. It should be understood that the numbers of the terminal devices, the network, and the server in FIG. 2 are merely schematic. There may be any number of terminal devices, networks and servers as desired for an implementation.

The technical essence of the present application lies in establishing the association between the user and the POI, and may have a use scenario that when the user uses map data to search for the POI, the query completion suggestions are recommended to the user in real time along with the query prefix input by the user. The query completion suggestions are obtained by ranking candidate POIs with a ranking model after determination of the candidate POIs corresponding to the query prefix input by the user. The present application provides a brand-new ranking model structure and training mode, such that query auto-completion based on the ranking model may better conform to user habits for inputting the query prefix, thus reducing an input cost. For the convenience of understanding of the present application, a method for building a ranking model will be described in detail in conjunction with to an embodiment.

First Embodiment

Figure 3:
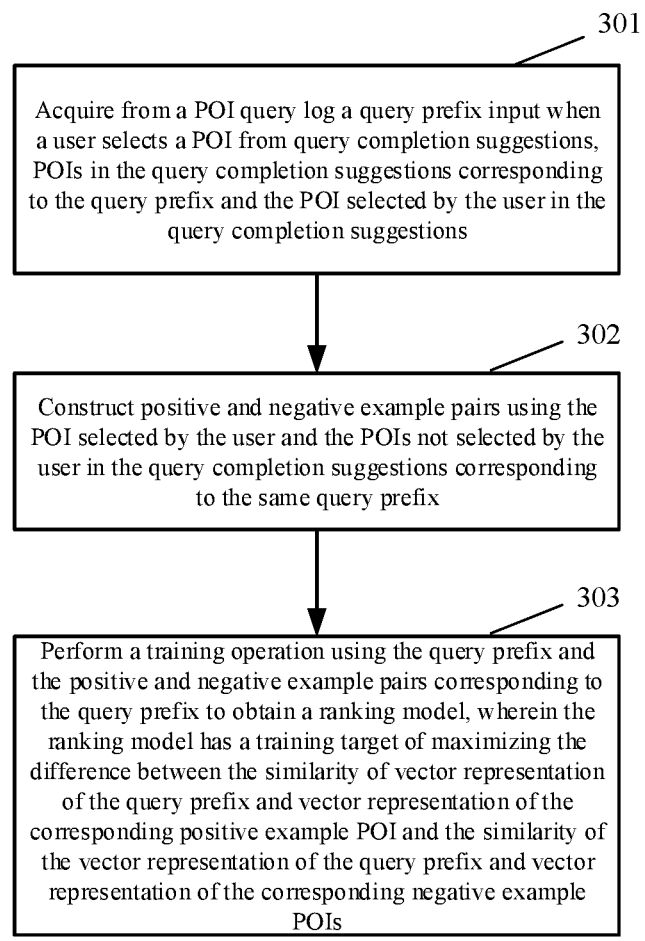
FIG. 3 is a flow chart of a method for building a ranking model according to an embodiment of the present application.

FIG. 3 is a flow chart of a method for building a ranking model according to an embodiment of the present application, and as shown in FIG. 3, the method may include the following steps:

301: acquiring from a POI query log a query prefix input when a user selects a POI from query completion suggestions, POIs in the query completion suggestions corresponding to the query prefix and the POI selected by the user in the query completion suggestions.

For example, in the process of inputting characters one by one to form the query prefixes, when inputting "Ba", the user user_A clicks the POI "Baidu Building-Tower A" from the query completion suggestions, user identification user_A, the query prefix "ba", each POI in the corresponding query completion suggestions, and the POI "Baidu Building-Tower A" selected by the user are acquired as one piece of data. In the same way, a plurality of pieces of data may be obtained from POI query logs of mass users for training the ranking model.

302: constructing positive and negative example pairs using the POI selected by the user and the POIs not selected by the user in the query completion suggestions corresponding to the same query prefix.

Continuing with the above example, the piece of data obtained in the step 301 has the user identification user_A, the query prefix "ba", each POI in the corresponding query completion suggestions, and the POI "Baidu Building-Tower A" selected by the user. For the same query prefix "ba", the corresponding POI "Baidu Building-Tower A" selected by the user serves as a positive example, and the POI "Badaling great wall" not selected by the user in the query completion suggestions serves as a negative example, such that "ba" and "Baidu Building-Tower A" constitute a positive example pair, and "ba" and "Badaling great wall" constitute a negative example pair. Since there exist other POIs not selected by the user in the query completion suggestions, such as "Baidu Building", "Baidu Science & Technology Park", or the like, "ba" and "Baidu Building" may also form a negative example pair, and "ba" and "Baidu Science & Technology Park" may also form a negative example pair.

303: performing a training operation using the query prefix and the positive and negative example pairs corresponding to the query prefix to obtain the ranking model, wherein the ranking model has a training target of maximizing the difference between the similarity of vector representation of the query prefix and vector representation of the corresponding positive example POI and the similarity of the vector representation of the query prefix and vector representation of the corresponding negative example POIs.

A traditional ranking model for query auto-completion has input not containing a query prefix, the query prefix is only used for recalling candidate POIs, and the ranking model outputs a score of each candidate POI according to the popularity of the candidate POI, user attribute information, or the like. In the embodiment of the present application, the input of the ranking model is the query prefix and the POIs, the vector representation of the query prefix and the vector representation of the POIs are both obtained inside the ranking model, and the score of each POI is output based on the similarity between the vector representation of the query prefix and the vector representation of the POI. Correspondingly, in the embodiment of the present application, when the ranking model is trained, a part for acquiring the vector representation of the query prefix and the vector representation of the POIs and a part for determining the similarity between the vector representation are trained uniformly.

Figure 4:
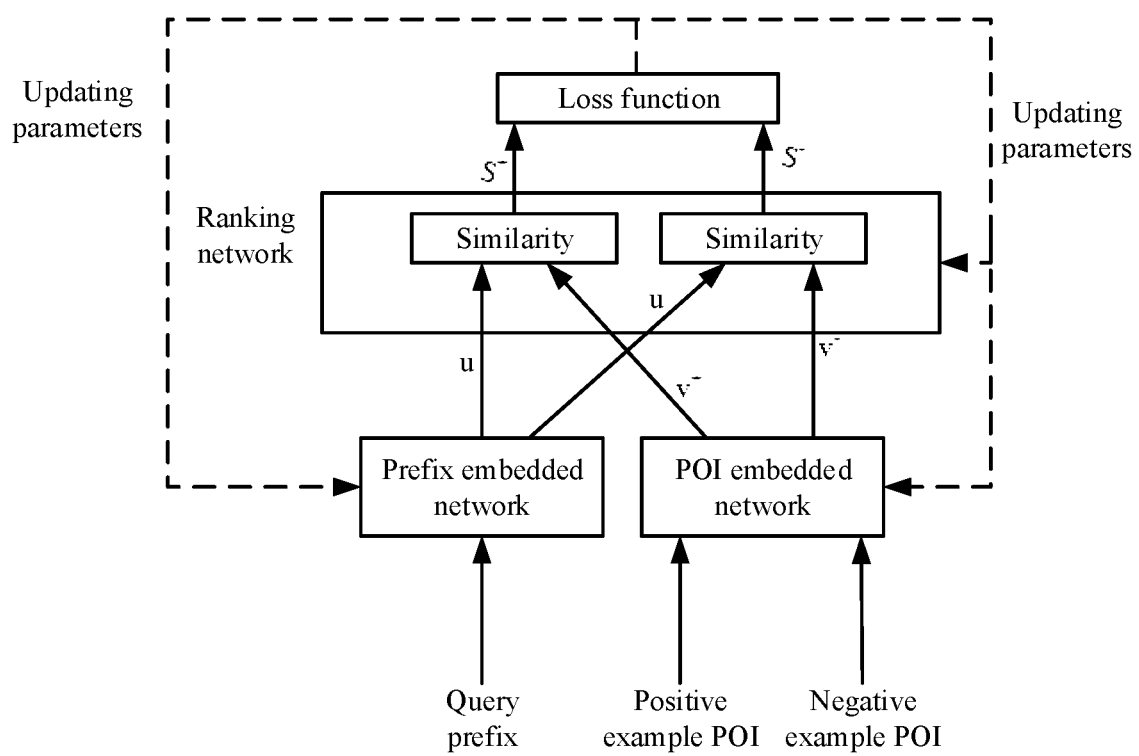
FIG. 4 is a schematic diagram of a structure for training the ranking model according to an embodiment of the present application.

Specifically, the ranking model in the present embodiment may include a prefix embedded network, a POI embedded network, and a ranking network, as shown in FIG. 4. The prefix embedded network is configured to obtain the vector representation of the query prefix, the POI embedded network is configured to obtain the vector representation of each POI, and the ranking network is configured to determine the similarity between the vector representation of the query prefix and the vector representation of the corresponding POIs.

That is, in the training process, for a piece of training data: a query prefix, a positive example POI corresponding to the query prefix and a negative example POI corresponding to the query prefix, the query prefix is input into the prefix embedded network, and vector representation u of the query prefix is output by the prefix embedded network. The positive and negative example POIs corresponding to the query prefix are input into the POI embedded network, and vector representation $v^+$ of the positive example POI and vector representation $v^-$ of the negative example POI are output by the POI embedded network. The ranking network respectively calculates the similarity $S^+$ between the vector representation u of the query prefix and the vector representation $v^+$ of the positive example POI, and the similarity S between the vector representation u of the query prefix and the vector representation $v^-$ of the negative example POI. The entire ranking model has a training target of maximizing the difference between $S^+$ an $S^-$.

Each network in the ranking model is described in detail below.

Prefix Embedded Network:

The prefix embedded network may include a recurrent neural network, such as a Bi-directional LSTM (Bi-LSTM). Character vectors corresponding to the characters in the query prefix are input into the Bi-LSTM sequentially, for example, when inputting the query prefix "ba", the user inputs "b" and "a" in sequence, and therefore, character vectors of "b" and "a" are input into the Bi-LSTM in sequence. The Bi-LSTM outputs vector representation for "b" and vector representation for "a" sequentially. The vector representation output for "a" may refer to previously memorized context information, and therefore, the vector representation for the last character "a" output by the Bi-LSTM is taken as the vector representation for the query prefix.

In addition, in addition to the query prefix, attribute features of the user may also have an impact on the POI which may be selected by the user. Therefore, as a preferred implementation, the prefix embedded network may further consider the attribute features of the user when determining the vector representation of the query prefix. Specifically, vectors of the attribute features of the user and the character vector corresponding to each character in the query prefix may be spliced respectively and then sequentially input into the recurrent neural network, and the feature vector representation of the query prefix is obtained using a feature vector corresponding to the last character and output by the recurrent neural network.

The attribute features of the user may include information, such as the user's age, gender, job, income level, city, etc., and the vector representation of the attribute features of the user may be obtained by encoding the information. The above-mentioned character vectors corresponding to the characters may be obtained by mapping the characters to a character vector space. Still taking input of the query prefix "ba" by the user as the example, the vectors of the attribute features of the user are firstly spliced with the character vector of the character "b", and then, the vector obtained after splicing is input into the recurrent neural network; and the vectors of the attribute features of the user are spliced with the character vector of the character "a", and then, the vector obtained after splicing is input into the recurrent neural network. The feature vector corresponding to "a" output by the recurrent neural network is taken as the vector representation of the query prefix "ba".

POI Embedded Network:

In the present embodiment, the POI embedded network is configured to encode attribute information of the POI to obtain the vector representation of the POI. The involved attribute information may include, but not limited to, the identification, name, category, address, tag, etc. of the POI.

Figure 5:
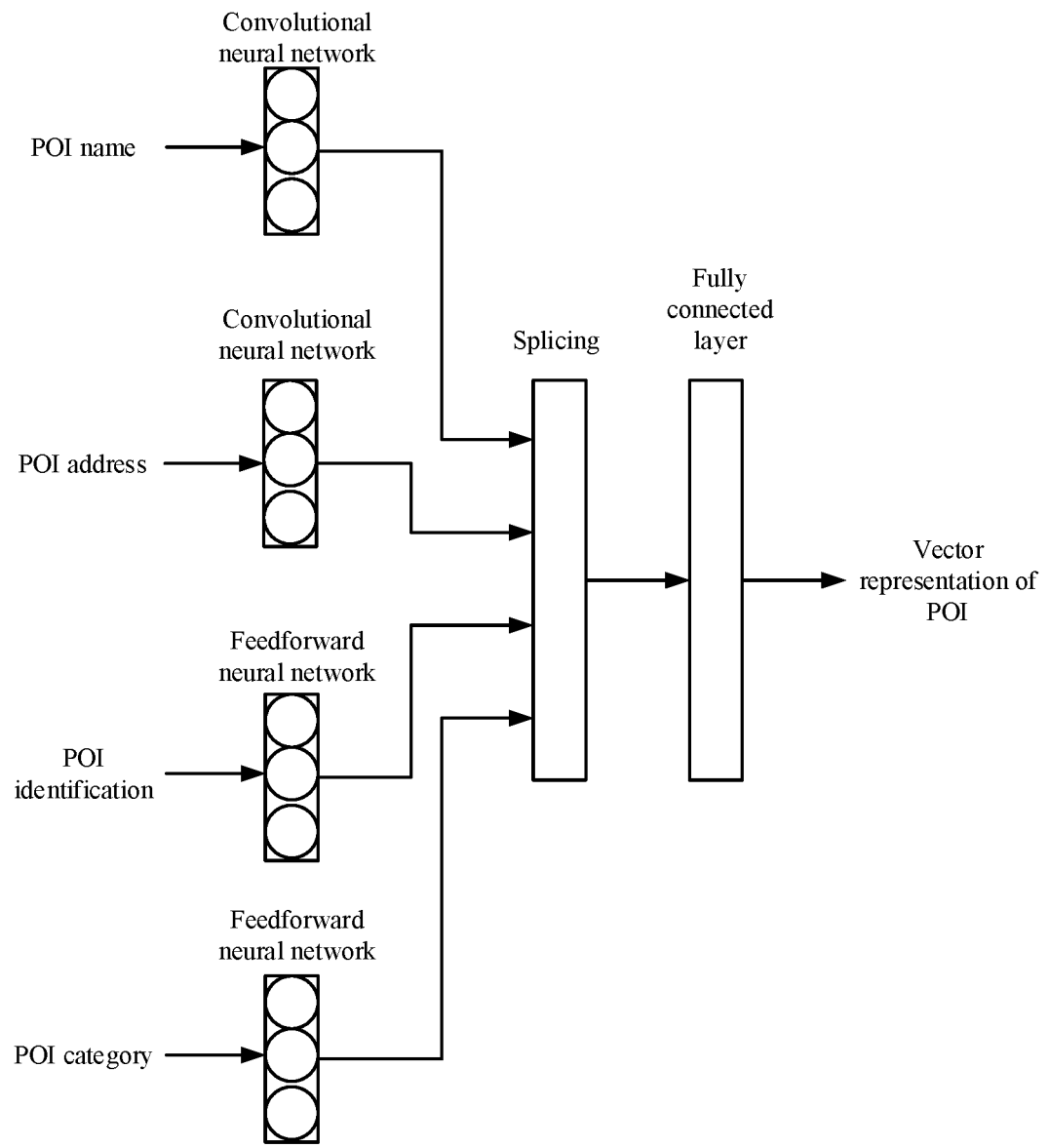
FIG. 5 is a schematic diagram of acquisition of POI vector representation according to an embodiment of the present application.

As a preferred implementation, the POI embedded network may include a convolutional neural network, a feedforward neural network and a fully connected layer. Name and address information of the POI may be encoded by the convolutional neural network, and other attribute information of the POI may be encoded by the feedforward neural network. Then, a vector obtained after the encoding results of the same POI are spliced is mapped by the fully connected layer to obtain the vector representation of the POI, as shown in FIG. 5.

Ranking Network:

The ranking network is mainly configured to calculate the similarity between the vector representation of the query prefix and the vector representation of the POI, and calculate the similarity between the query prefix and the positive example POI and the similarity between the query prefix and the negative example POI respectively for one positive example pair and one negative example pair in the training process. For example, in the present application, the similarity may be calculated by means of the L2 paradigm which requires that the vector representation of the query prefix has a dimension consistent with the vector representation of the POI.

In the model training process, the above-mentioned training target may be embodied as minimizing a triple loss function $L_A$, for example, using the following formula:

$$L_A = \Sigma \max(s^+ - s^- + \tau, 0)$$

wherein $\tau$ is a hyper-parameter.

In each iteration, the above-mentioned triple loss function is determined using output of the ranking network, and feedforward is then performed using the triple loss function to update model parameters of the prefix embedded network, the POI embedded network and the ranking network until the triple loss function meets a preset requirement or a preset number of times that the model parameters are updated (i.e., number of iterations) is reached.

At this point, the ranking model is obtained by the training process.

Second Embodiment

Figure 6:
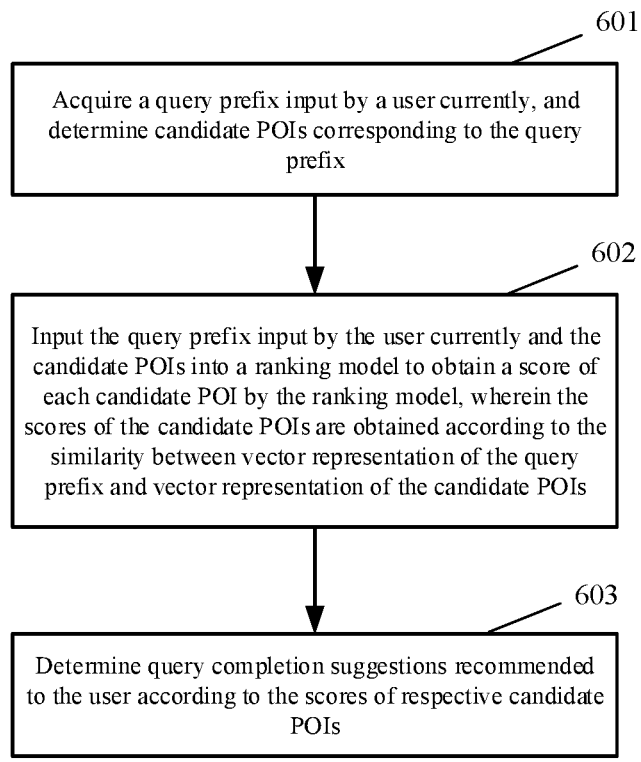
FIG. 6 is a flow chart of a query auto-completion method according to an embodiment of the present application.

FIG. 6 is a flow chart of a query auto-completion method according to an embodiment of the present application, and as shown in FIG. 6, the method may include the following steps:

601: acquiring a query prefix input by a user currently, and determining candidate POIs corresponding to the query prefix.

The method is suitable for various types of input contents, such as Chinese characters, pinyin, initials, or the like, but the input query prefix may be regarded as a character string. As the user inputs the query prefix, the query prefix input by the user currently is acquired in real time. For example, in the process of inputting "Baidu Building" by the user, the user may input a plurality of query prefixes, such as "Bai", "Baidu" and "Baidu Build", and the method according to the present application is executed for each query prefix. That is, when the user inputs "Bai", the currently input query prefix is "Bai", and the method according to the present application is executed for the query prefix to recommend query completion suggestions to the user. When the user inputs "Baidu", the currently input query prefix is "Baidu", and the method according to the present application is executed for the query prefix to recommend query completion suggestions to the user. When the user inputs "Baidu Build", the currently input query prefix is "Baidu Build", and the method according to the present application is executed for the query prefix to recommend query completion suggestions to the user.

The manner for determining the candidate POIs corresponding to the currently input query prefix may adopt an existing implementation manner, and aims to find POIs with the query prefix as the beginning of texts, or find POIs strongly related to the query prefix.

For example, a reverse index may be established in advance for POIs in a POI library with various corresponding query prefixes. When the user inputs a query, the POI library is queried according to the query prefix input currently, and all hit POIs serve as the candidate POIs.

As another example, associations between POIs and various query prefixes may be pre-established in the POI library, and obtained from user search history. For example, after the user inputs "Zhe university", a POI "Zhejiang university" is selected from search results. The associations may also be obtained using a synonymous POI vocabulary, for example, "The Imperial Palace" is also known as "The Forbidden City", and associations between "forbidden", etc. and the POI "The Imperial Palace" are pre-established. The associations may also be added manually.

602: inputting the query prefix input by the user currently and the candidate POIs into a ranking model to obtain a score of each candidate POI by the ranking model, wherein the scores of the candidate POIs are obtained according to the similarity between vector representation of the query prefix and vector representation of the candidate POIs.

Figure 7:
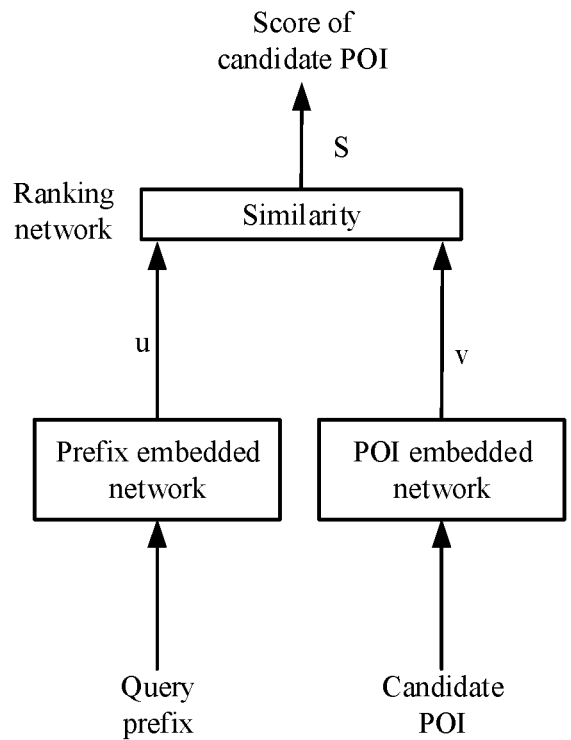
FIG. 7 is a schematic diagram of a working principle of the ranking model according to an embodiment of the present application.

Similarly to the first embodiment, the query prefix input by the user currently and the candidate POIs are input to the prefix embedded network and the POI embedded network in the ranking model respectively, so as to obtain the vector representation u of the query prefix and the vector representation v of the candidate POIs, and then, the ranking network determines the similarity S between the vector representation u of the query prefix and the vector representation v of each candidate POI, and scores each candidate POI according to the similarity, as shown in FIG. 7.

Specifically, during implementation in the prefix embedded network of the ranking model, a character vector corresponding to each character in the query prefix may be sequentially input into a recurrent neural network, and the vector representation of the query prefix may be obtained using a feature vector for the last character output by the recurrent neural network.

As a preferred implementation, during implementation of the prefix embedded network of the ranking model, vectors of attribute features of the user and the character vector corresponding to each character in the query prefix may be spliced respectively and then sequentially input into the recurrent neural network, and the vector representation of the query prefix is obtained using the feature vector corresponding to the last character and output by the recurrent neural network.

The attribute features of the user may include information, such as the user's age, gender, job, income level, city, etc., and the vector representation of the attribute features of the user may be obtained by encoding the information. The above-mentioned character vectors corresponding to the characters may be obtained by mapping the characters to a character vector space.

The candidate POI are input into the POI embedded network, and the POI embedded network is configured to encode attribute information of the POI to obtain the vector representation of the candidate POI. The involved attribute information may include, but not limited to, the identification, name, category, address, tag, etc. of the candidate POI.

The POI embedded network may include a convolutional neural network, a feedforward neural network and a fully connected layer. Name and address information of the candidate POI may be encoded by the convolutional neural network, and other attribute information of the candidate POI may be encoded by the feedforward neural network. Then, a vector obtained after the encoding results of the same candidate POI are spliced is mapped by the fully connected layer to obtain the vector representation of the candidate POI.

The ranking network may calculate the similarity between the vector representation of the query prefix input by the user and the vector representation of the candidate POI by means of the L2 paradigm, for example.

603: determining query completion suggestions recommended to the user according to the scores of respective candidate POIs.

In this step, the candidate POIs with score values greater than or equal to a preset score threshold may be used as the query completion suggestions, or the POIs with top P score values may be used as the query completion suggestions, and so on, and P is a preset positive integer. When the query completion suggestions are recommended to the user, the POIs are ranked in a candidate list according to the scores thereof An existing drop-down box near the search box or other forms may be adopted as the recommendation way.

By the manner in the present embodiment, the query prefix input by the user is merged into the ranking model for POI ranking learning, such that the ranking model may learn the personalized query prefix input by the user when the user selects the POI in the query completion suggestions. Query auto-completion performed based on the ranking model may better conform to user habits for inputting the query prefix, thus reducing the input cost of the user. For example, the user habitually clicks "Baidu Building-Tower A" from the query completion suggestions for search when inputting the query prefix "ba". With the present application, the ranking model may learn the input habit of the user, such that when the user inputs the query prefix "ba", the ranking of "Baidu Building-Tower A" may be improved in the query completion suggestions, and the user may easily select "Baidu Building-Tower A" from the query completion suggestions. The user does not need to search the POI "Baidu Building-Tower A" from a position with a lower ranking and even input more characters to enable "Baidu Building-Tower A" to appear in the query completion suggestions due to low popularity of this POI. Obviously, the input efficiency of the user is improved, and the input cost is reduced.

In addition, with the present application, some unique input habits may also be learned well. For example, a user is used to searching the POI "Tsinghua University" with "thu" as the query prefix. With the present application, the input habit of the user may be learned by the ranking model, and when the user or another user inputs "thu", the query completion suggestion "Tsinghua University" may be given quickly, thereby improving the use experience of the user.

The method according to the present application is described above in detail, and an apparatus according to the present application will be described below in detail in conjunction with an embodiment.

Third Embodiment

Figure 8:
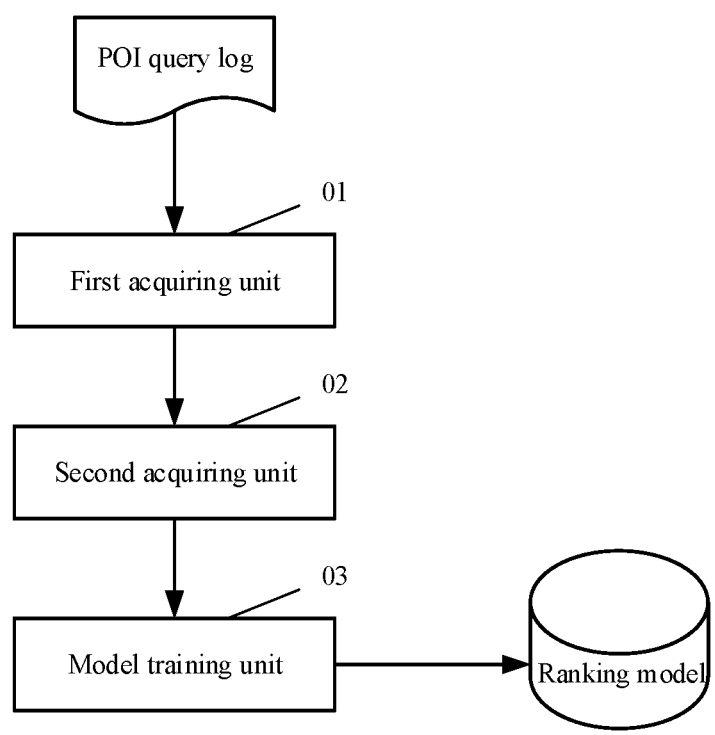
FIG. 8 is a structural diagram of an apparatus for building a ranking model according to an embodiment of the present application.

FIG. 8 is a structural diagram of an apparatus for building a ranking model according to an embodiment of the present application, and as shown in FIG. 8, the apparatus includes a first acquiring unit 01, a second acquiring unit 02 and a model training unit 03, and the main functions of each constitutional unit are as follows.

The first acquiring unit 01 is configured to acquire from a POI query log a query prefix input when a user selects a POI from query completion suggestions, POIs in the query completion suggestions corresponding to the query prefix and the POI selected by the user in the query completion suggestions.

The second acquiring unit 02 is configured to construct positive and negative example pairs using the POI selected by the user and the POIs not selected by the user in the query completion suggestions corresponding to the same query prefix.

The model training unit 03 is configured to perform a training operation using the query prefix and the positive and negative example pairs corresponding to the query prefix to obtain a ranking model.

The ranking model includes a prefix embedded network, a POI embedded network, and a ranking network; the prefix embedded network is configured to obtain the vector representation of the query prefix, the POI embedded network is configured to obtain the vector representation of each POI, and the ranking network is configured to determine the similarity between the vector representation of the query prefix and the vector representation of the corresponding POIs; and the ranking model has a training target of maximizing the difference between the similarity of vector representation of the query prefix and vector representation of the corresponding positive example POI and the similarity of the vector representation of the query prefix and vector representation of the corresponding negative example POIs.

Specifically, the prefix embedded network includes a recurrent neural network. In the process of training the ranking model, the model training unit 03 may sequentially input a character vector corresponding to each character in the query prefix into a recurrent neural network, and obtain the vector representation of the query prefix using a feature vector for the last character output by the recurrent neural network.

As a preferred implementation, in the process of training the ranking model, the model training unit 03 may splice vectors of attribute features of the user and a character vector corresponding to each character in the query prefix respectively, then sequentially input the results into a recurrent neural network, and obtain the vector representation of the query prefix using a feature vector corresponding to the last character and output by the recurrent neural network.

Specifically, in the process of training the ranking model, the model training unit 03 may encode attribute information of the POI by the POI embedded network to obtain the vector representation of the POI.

As a preferred implementation, the POI embedded network may include a convolutional neural network, a feedforward neural network and a fully connected layer. When encoding the attribute information of the POI by the POI embedded network, the model training unit 03 may encode name and address information of the POI by the convolutional neural network; encode other attribute information of the POI by the feedforward neural network; and splice the encoding results of the same POI, and then map the splicing result by the fully connected layer to obtain the vector representation of the POI.

Specifically, in the process of training the ranking model, the model training unit 03 determines a loss function using output of the ranking network, and performs feedforward using the loss function to update model parameters of the prefix embedded network, the POI embedded network and the ranking network until the loss function meets a preset requirement or a preset number of times that the model parameters are updated is reached.

Fourth Embodiment

Figure 9:
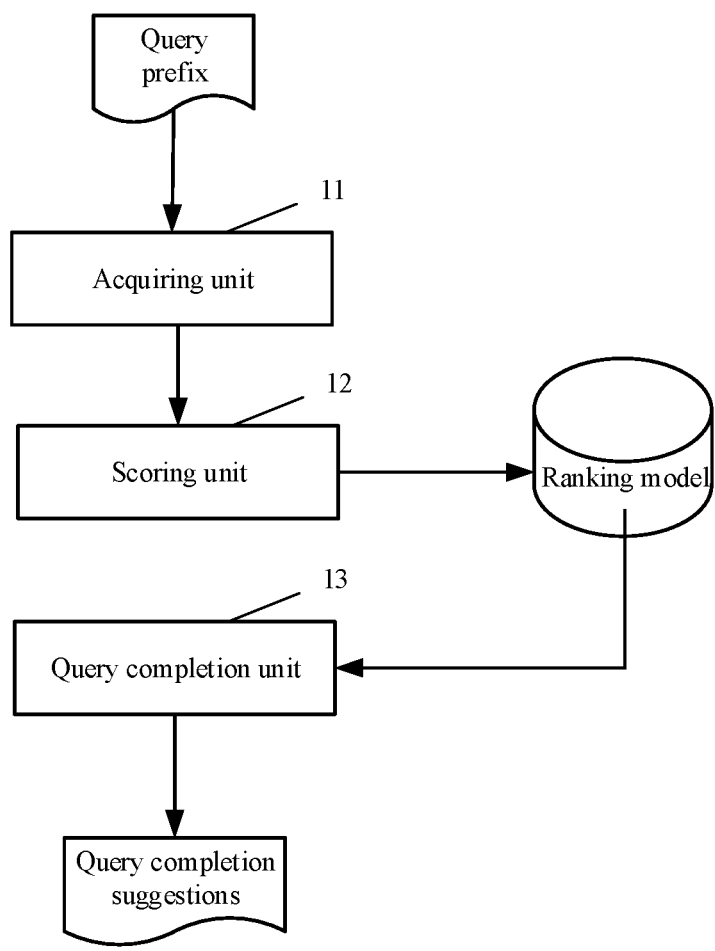
FIG. 9 is a structural diagram of a query auto-completion apparatus according to an embodiment of the present application.

FIG. 9 is a structural diagram of a query auto-completion apparatus according to an embodiment of the present application, and a ranking model used in the apparatus is obtained by performing a pre-training operation by the apparatus shown in FIG. 8. As shown in FIG. 9, the apparatus includes an acquiring unit 11, a scoring unit 12 and a query completion unit 13. The main functions of each constitutional unit are as follows.

The acquiring unit 11 is configured to acquire a query prefix input by a user currently, and determine candidate Points of Interest (POI) corresponding to the query prefix.

The scoring unit 12 is configured to input the query prefix and the candidate POIs into the ranking model to obtain a score of each candidate POI by the ranking model, wherein the scores of the candidate POIs are obtained according to the similarity between vector representation of the query prefix and vector representation of the candidate POIs.

Specifically, in the ranking model, the scoring unit 12 may sequentially input a character vector corresponding to each character in the query prefix into a recurrent neural network, and obtain the vector representation of the query prefix using a feature vector for the last character output by the recurrent neural network.

As a preferred implementation, in the ranking model, the scoring unit 12 may splice vectors of attribute features of the user and the character vector corresponding to each character in the query prefix respectively, then sequentially input the results into the recurrent neural network, and obtain the vector representation of the query prefix using the feature vector corresponding to the last character and output by the recurrent neural network.

Specifically, in the ranking model, the scoring unit 12 may encode attribute information of each POI to obtain the vector representation of the POI.

As a preferred implementation, in the ranking model, the scoring unit 12 may encode name and address information of the POI by the convolutional neural network; encode other attribute information of the POI by the feedforward neural network; and splice the encoding results of the same POI, and then map the splicing result by the fully connected layer to obtain the vector representation of the POI.

The ranking network may calculate the similarity between the vector representation of the query prefix input by the user and the vector representation of the candidate POI by means of the L2 paradigm, for example.

The query completion unit 13 is configured to determine query completion suggestions recommended to the user according to the scores of respective candidate POIs.

Specifically, the query completion unit 13 may use the candidate POIs with score values greater than or equal to a preset score threshold as the query completion suggestions, or the POIs with top P score values as the query completion suggestions, and so on, and P is a preset positive integer. When the query completion suggestions are recommended to the user, the POIs are ranked in a candidate list according to the scores thereof An existing drop-down box near the search box or other forms may be adopted as the recommendation way.

According to the embodiment of the present application, there are also provided an electronic device and a readable storage medium.

Figure 10:
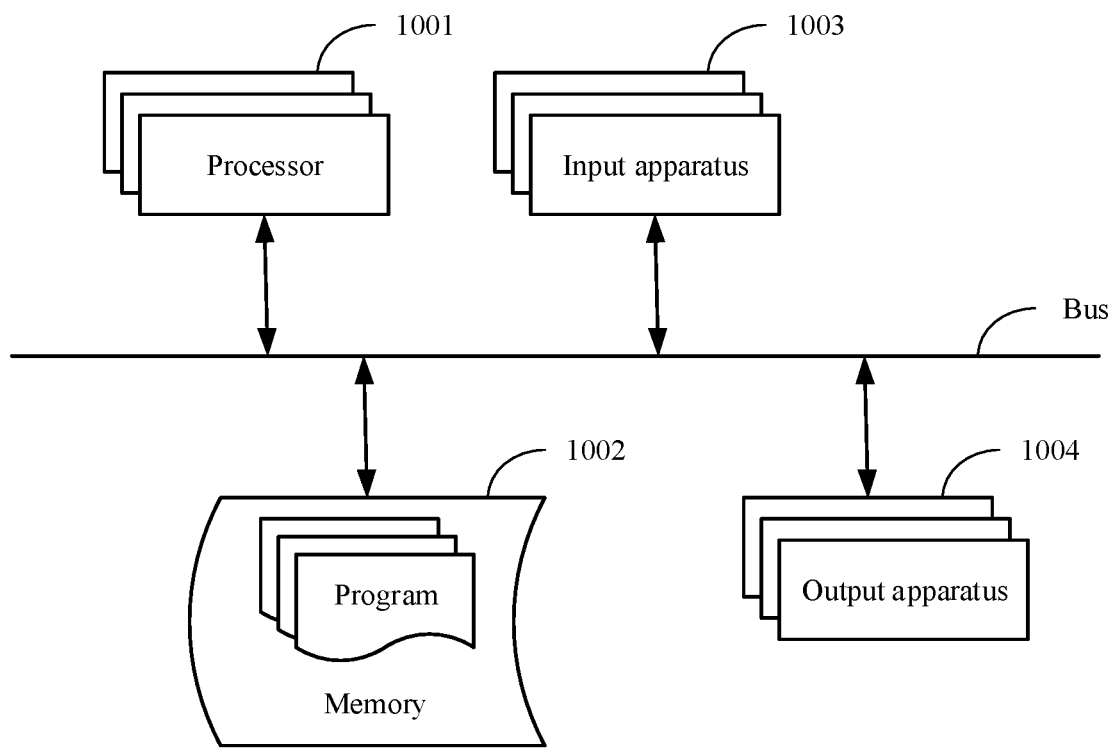
FIG. 10 is a block diagram of an electronic device configured to implement the methods according to the embodiments of the present application.

FIG. 10 is a block diagram of an electronic device for the method for building a ranking model or the query auto-completion method according to the embodiments of the present application. The electronic device is intended to represent various forms of digital computers, such as laptop computers, desktop computers, workstations, personal digital assistants, servers, blade servers, mainframe computers, and other appropriate computers. The electronic device may also represent various forms of mobile apparatuses, such as personal digital processors, cellular telephones, smart phones, wearable devices, and other similar computing apparatuses. The components shown herein, their connections and relationships, and their functions, are meant to be exemplary only, and are not meant to limit implementation of the present application described and/or claimed herein.

As shown in FIG. 10, the electronic device includes one or more processors 1001, a memory 1002, and interfaces configured to connect the components, including high-speed interfaces and low-speed interfaces. The components are interconnected using different buses and may be mounted at a common motherboard or in other manners as desired. The processor may process instructions for execution within the electronic device, including instructions stored in or at the memory to display graphical information for a GUI at an external input/output apparatus, such as a display device coupled to the interface. In other implementations, plural processors and/or plural buses may be used with plural memories, if desired. Also, plural electronic devices may be connected, with each device providing some of necessary operations (for example, as a server array, a group of blade servers, or a multi-processor system). In FIG. 10, one processor 1001 is taken as an example.

The memory 1002 is configured as the non-transitory computer readable storage medium according to the present application. The memory stores instructions executable by the at least one processor to cause the at least one processor to perform a method for building a ranking model or a query auto-completion method according to the present application. The non-transitory computer readable storage medium according to the present application stores computer instructions for causing a computer to perform the method for building a ranking model or the query auto-completion method according to the present application.

The memory 1002 which is a non-transitory computer readable storage medium may be configured to store non-transitory software programs, non-transitory computer executable programs and modules, such as program instructions/modules corresponding to the method for building a ranking model or the query auto-completion method according to the embodiments of the present application. The processor 1001 executes various functional applications and data processing of a server, that is, implements the method for building a ranking model or the query auto-completion method according to the above-mentioned embodiments, by running the non-transitory software programs, instructions, and modules stored in the memory 1002.

The memory 1002 may include a program storage area and a data storage area, wherein the program storage area may store an operating system and an application program required for at least one function; the data storage area may store data created according to use of the electronic device, or the like. Furthermore, the memory 1002 may include a high-speed random access memory, or a non-transitory memory, such as at least one magnetic disk storage device, a flash memory device, or other non-transitory solid state storage devices. In some embodiments, optionally, the memory 1002 may include memories remote from the processor 1001, and such remote memories may be connected to the electronic device via a network. Examples of such a network include, but are not limited to, the Internet, intranets, local area networks, mobile communication networks, and combinations thereof.

The electronic device may further include an input apparatus 1003 and an output apparatus 1004. The processor 1001, the memory 1002, the input apparatus 1003 and the output apparatus 1004 may be connected by a bus or other means, and FIG. 10 takes the connection by a bus as an example.

The input apparatus 1003 may receive input numeric or character information and generate key signal input related to user settings and function control of the electronic device, such as a touch screen, a keypad, a mouse, a track pad, a touch pad, a pointing stick, one or more mouse buttons, a trackball, a joystick, or the like. The output apparatus 1004 may include a display device, an auxiliary lighting apparatus (for example, an LED) and a tactile feedback apparatus (for example, a vibrating motor), or the like. The display device may include, but is not limited to, a liquid crystal display (LCD), a light emitting diode (LED) display, and a plasma display. In some implementations, the display device may be a touch screen.

Various implementations of the systems and technologies described here may be implemented in digital electronic circuitry, integrated circuitry, application specific integrated circuits (ASIC), computer hardware, firmware, software, and/or combinations thereof. The systems and technologies may be implemented in one or more computer programs which are executable and/or interpretable on a programmable system including at least one programmable processor, and the programmable processor may be special or general, and may receive data and instructions from, and transmitting data and instructions to, a storage system, at least one input apparatus, and at least one output apparatus.

These computer programs (also known as programs, software, software applications, or codes) include machine instructions for a programmable processor, and may be implemented using high-level procedural and/or object-oriented programming languages, and/or assembly/machine languages. As used herein, the terms "machine readable medium" and "computer readable medium" refer to any computer program product, device and/or apparatus (for example, magnetic discs, optical disks, memories, programmable logic devices (PLD)) for providing machine instructions and/or data for a programmable processor, including a machine readable medium which receives machine instructions as a machine readable signal. The term "machine readable signal" refers to any signal for providing machine instructions and/or data for a programmable processor.

To provide interaction with a user, the systems and technologies described here may be implemented on a computer having: a display apparatus (for example, a cathode ray tube (CRT) or liquid crystal display (LCD) monitor) for displaying information to a user; and a keyboard and a pointing apparatus (for example, a mouse or a trackball) by which a user may provide input for the computer. Other kinds of apparatuses may also be used to provide interaction with a user; for example, feedback provided for a user may be any form of sensory feedback (for example, visual feedback, auditory feedback, or tactile feedback); and input from a user may be received in any form (including acoustic, voice or tactile input).

The systems and technologies described here may be implemented in a computing system (for example, as a data server) which includes a back-end component, or a computing system (for example, an application server) which includes a middleware component, or a computing system (for example, a user computer having a graphical user interface or a web browser through which a user may interact with an implementation of the systems and technologies described here) which includes a front-end component, or a computing system which includes any combination of such back-end, middleware, or front-end components. The components of the system may be interconnected through any form or medium of digital data communication (for example, a communication network). Examples of the communication network include: a local area network (LAN), a wide area network (WAN) and the Internet.

A computer system may include a client and a server. Generally, the client and the server are remote from each other and interact through the communication network. The relationship between the client and the server is generated by virtue of computer programs which run on respective computers and have a client-server relationship to each other.

From the foregoing description, the above-mentioned method and apparatus, the device as well as the computer storage medium according to the embodiments of the present application may have the following advantages.

1) The personalized query prefix input by the user is merged into the ranking model for POI ranking learning, such that the ranking model may learn the personalized query prefix input by the user when the user selects the POI in the query completion suggestions. Query auto-completion performed based on the ranking model may better conform to the user habits for inputting the query prefix, thus reducing the input cost of the user.

2) When the vector representation of the query prefix is obtained, the recurrent neural network is adopted, such that the vector representation of the query prefix may better accord with context constraints of the texts.

3) In the present application, when the attribute information of each POI is encoded, the POI as an aggregate of multi-source information is taken into full consideration, and information, such as the name, address, category, identification, or the like, of the POI is fused, thereby more accurately representing the POI.

It should be understood that various forms of the flows shown above may be used and reordered, and steps may be added or deleted. For example, the steps described in the present application may be executed in parallel, sequentially, or in different orders, which is not limited herein as long as the desired results of the technical solution disclosed in the present application may be achieved.

The above-mentioned implementations are not intended to limit the scope of the present application. It should be understood by those skilled in the art that various modifications, combinations, sub-combinations and substitutions may be made, depending on design requirements and other factors. Any modification, equivalent substitution and improvement made within the spirit and principle of the present application all should be included in the extent of protection of the present application.

What is claimed is:

1. A method for building a ranking model for query auto-completion, comprising:
    acquiring from a POI query log a query prefix input when a user selects a POI from query completion suggestions, POIs in the query completion suggestions corresponding to the query prefix and the POI selected by the user in the query completion suggestions;
    constructing positive and negative example pairs using the POI selected by the user and the POIs not selected by the user in the query completion suggestions corresponding to the same query prefix; and
    performing a training operation using the query prefix and the positive and negative example pairs corresponding to the query prefix to obtain the ranking model;
    wherein the ranking model has a training target of maximizing the difference between the similarity of vector representation of the query prefix and vector representation of the corresponding positive example POI and the similarity of the vector representation of the query prefix and vector representation of the corresponding negative example POIs,
    wherein the ranking model comprises a prefix embedded network, a POI embedded network, and a ranking network; and
    the prefix embedded network is configured to obtain the vector representation of the query prefix, the POI embedded network is configured to obtain the vector representation of each POI, and the ranking network is configured to determine the similarity between the vector representation of the query prefix and the vector representation of the corresponding POIs,
    wherein the obtaining vector representation of each POI comprises:
        encoding attribute information of the POI to obtain the vector representation of the POI,
    wherein the POI embedded network comprises a convolutional neural network, a feedforward neural network and a fully connected layer; and
    the encoding attribute information of the POI comprises:
        encoding name and address information of the POI by the convolutional neural network;
        encoding other attribute information of the POI by a feedforward neural network; and
        splicing the encoding results of the same POI, and then mapping the splicing result by a fully connected layer to obtain the vector representation of the POI.

2. The method according to claim 1, wherein the prefix embedded network comprises a recurrent neural network; and
    the obtaining the vector representation of the query prefix comprises:
    sequentially inputting a character vector corresponding to each character in the query prefix into the recurrent neural network, and obtaining the vector representation of the query prefix using a feature vector for the last character output by the recurrent neural network; or
    splicing vectors of attribute features of the user and a character vector corresponding to each character in the query prefix respectively, then sequentially inputting the results into the recurrent neural network, and obtaining the vector representation of the query prefix using a feature vector corresponding to the last character and output by the recurrent neural network.

3. The method according to claim 1, wherein in the process of training the ranking model, a triple loss function is determined using output of the ranking network, and feedforward is performed using the triple loss function to update model parameters of the prefix embedded network, the POI embedded network and the ranking network until the triple loss function meets a preset requirement or a preset number of times that the model parameters are updated is reached.

4. A query auto-completion method, comprising:
acquiring a query prefix input by a user currently, and determining candidate Points of Interest (POIs) corresponding to the query prefix;
inputting the query prefix and the candidate POIs into a ranking model to obtain a score of each candidate POI by the ranking model, wherein the scores of the candidate POIs are obtained according to the similarity between vector representation of the query prefix and vector representation of the candidate POIs; and
determining query completion suggestions recommended to the user according to the scores of respective candidate POIs;
wherein the ranking model is obtained by performing a pre-training operation with the method according to claim 1,
wherein the vector representation of each candidate POI is determined by:
in the ranking model, encoding attribute information of each POI to obtain the vector representation of the POI,
wherein the encoding attribute information of the POI comprises:
in the ranking model, encoding name and address information of the POI by a convolutional neural network;
encoding other attribute information of the POI by a feedforward neural network; and
splicing the encoding results of the same POI, and then mapping the splicing result by a fully connected layer to obtain the vector representation of the POI.

5. The method according to claim 4, wherein the vector representation of the query prefix is obtained by:
in the ranking model, sequentially inputting a character vector corresponding to each character in the query prefix into a recurrent neural network, and obtaining the vector representation of the query prefix using a feature vector for the last character output by the recurrent neural network; or
in the ranking model, splicing vectors of attribute features of the user and a character vector corresponding to each character in the query prefix respectively, then sequentially inputting the results into a recurrent neural network, and obtaining the vector representation of the query prefix using a feature vector corresponding to the last character and output by the recurrent neural network.

6. An electronic device, comprising:
at least one processor; and
a memory communicatively connected with the at least one processor;
wherein the memory stores instructions executable by the at least one processor, and the instructions are executed by the at least one processor to enable the at least one processor to perform a method for building a ranking model for query auto-completion, wherein the method comprises:
acquiring from a POI query log a query prefix input when a user selects a POI from query completion suggestions, POIs in the query completion suggestions corresponding to the query prefix and the POI selected by the user in the query completion suggestions;
constructing positive and negative example pairs using the POI selected by the user and the POIs not selected by the user in the query completion suggestions corresponding to the same query prefix; and
performing a training operation using the query prefix and the positive and negative example pairs corresponding to the query prefix to obtain a ranking model;
wherein the ranking model has a training target of maximizing the difference between the similarity of vector representation of the query prefix and vector representation of the corresponding positive example POI and the similarity of the vector representation of the query prefix and vector representation of the corresponding negative example POIs,
wherein the ranking model comprises a prefix embedded network, a POI embedded network, and a ranking network; and
the prefix embedded network is configured to obtain the vector representation of the query prefix, the POI embedded network is configured to obtain the vector representation of each POI, and the ranking network is configured to determine the similarity between the vector representation of the query prefix and the vector representation of the corresponding POIs,
wherein the obtaining vector representation of each POI comprises:
encoding attribute information of the POI to obtain the vector representation of the POI,
wherein the POI embedded network comprises a convolutional neural network, a feedforward neural network and a fully connected layer; and
the encoding attribute information of the POI comprises:
encoding name and address information of the POI by the convolutional neural network;
encoding other attribute information of the POI by a feedforward neural network; and
splicing the encoding results of the same POI, and then mapping the splicing result by a fully connected layer to obtain the vector representation of the POI.

7. The electronic device according to claim 6, wherein the prefix embedded network comprises a recurrent neural network; and
the obtaining the vector representation of the query prefix comprises:
sequentially inputting a character vector corresponding to each character in the query prefix into the recurrent neural network, and obtaining the vector representation of the query prefix using a feature vector for the last character output by the recurrent neural network; or
splicing vectors of attribute features of the user and a character vector corresponding to each character in the query prefix respectively, then sequentially input the results into the recurrent neural network, and obtaining the vector representation of the query prefix using a feature vector corresponding to the last character and output by the recurrent neural network.

8. The electronic device according to claim 6, wherein in the process of training the ranking model, a triple loss function is determined using output of the ranking network, and feedforward is performed using the triple loss function to update model parameters of the prefix embedded network, the POI embedded network and the ranking network until the triple loss function meets a preset requirement or a preset number of times that the model parameters are updated is reached.

9. A non-transitory computer-readable storage medium storing computer instructions therein, wherein the computer instructions are used to cause the computer to perform a method for building a ranking model for query auto-completion, wherein the method comprises:

acquiring from a POI query log a query prefix input when a user selects a POI from query completion suggestions, POIs in the query completion suggestions corresponding to the query prefix and the POI selected by the user in the query completion suggestions;

constructing positive and negative example pairs using the POI selected by the user and the POIs not selected by the user in the query completion suggestions corresponding to the same query prefix; and performing a training operation using the query prefix and the positive and negative example pairs corresponding to the query prefix to obtain the ranking model;

wherein the ranking model has a training target of maximizing the difference between the similarity of vector representation of the query prefix and vector representation of the corresponding positive example POI and the similarity of the vector representation of the query prefix and vector representation of the corresponding negative example POIs, wherein the ranking model comprises a prefix embedded network, a POI embedded network, and a ranking network; and the prefix embedded network is configured to obtain the vector representation of the query prefix, the POI embedded network is configured to obtain the vector representation of each POI, and the ranking network is configured to determine the similarity between the vector representation of the query prefix and the vector representation of the corresponding POIs, wherein the obtaining vector representation of each POI comprises:

encoding attribute information of the POI to obtain the vector representation of the POI, wherein the POI embedded network comprises a convolutional neural network, a feedforward neural network and a fully connected layer; and the encoding attribute information of the POI comprises:
encoding name and address information of the POI by the convolutional neural network;
encoding other attribute information of the POI by a feedforward neural network; and
splicing the encoding results of the same POI, and then mapping the splicing result by a fully connected layer to obtain the vector representation of the POI.

10. The non-transitory computer-readable storage medium according to claim 9, wherein the prefix embedded network comprises a recurrent neural network; and the obtaining the vector representation of the query prefix comprises:

sequentially inputting a character vector corresponding to each character in the query prefix into the recurrent neural network, and obtaining the vector representation of the query prefix using a feature vector for the last character output by the recurrent neural network; or splicing vectors of attribute features of the user and a character vector corresponding to each character in the query prefix respectively, then sequentially inputting the results into the recurrent neural network, and obtaining the vector representation of the query prefix using a feature vector corresponding to the last character and output by the recurrent neural network.

* * * * *